US008923360B2

(12) United States Patent
Coleman et al.

(10) Patent No.: US 8,923,360 B2
(45) Date of Patent: *Dec. 30, 2014

(54) GRAPHITE ELECTRODES

(71) Applicants: Philip Dennis Coleman, Avon, OH (US); Michael Frastaci, Parma, OH (US); Gregory E. Murray, Parma, OH (US); Marco Napolitano, Cleveland, OH (US); Aaron Tomasek, Lodi, OH (US); Brian Bowman, Westlake, OH (US); Daniel W. Krassowski, Los Gatos, CA (US)

(72) Inventors: Philip Dennis Coleman, Avon, OH (US); Michael Frastaci, Parma, OH (US); Gregory E. Murray, Parma, OH (US); Marco Napolitano, Cleveland, OH (US); Aaron Tomasek, Lodi, OH (US); Brian Bowman, Westlake, OH (US); Daniel W. Krassowski, Los Gatos, CA (US)

(73) Assignee: GrafTech International Holdings Inc., Parma, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/859,997

(22) Filed: Apr. 10, 2013

(65) Prior Publication Data
US 2013/0279534 A1 Oct. 24, 2013

Related U.S. Application Data

(63) Continuation of application No. 13/580,997, filed as application No. PCT/US2011/042407 on Jun. 29, 2011.

(60) Provisional application No. 61/360,822, filed on Jul. 1, 2010.

(51) Int. Cl.
*H05B 7/06* (2006.01)
*H05B 6/14* (2006.01)
*H05B 7/07* (2006.01)
*H01M 4/96* (2006.01)

(52) U.S. Cl.
CPC . *H05B 7/07* (2013.01); *H01M 4/96* (2013.01); *H05B 7/06* (2013.01); *Y02E 60/50* (2013.01)
USPC .................................. 373/91; 373/82; 373/88

(58) Field of Classification Search
CPC .............. H05B 7/06; H05B 7/07; H05B 7/08; H05B 7/12; H05B 7/14; H05B 31/06; H05B 31/08; F27B 3/085
USPC ........... 373/88, 89, 90, 92, 93, 94, 97, 81, 82, 373/36, 37, 69, 95, 96; 29/825; 156/212
See application file for complete search history.

(56) References Cited

U.S. PATENT DOCUMENTS 1,223,986 A * 4/1917 King ............................... 373/64
1,314,603 A 9/1919 Mott (Continued)

FOREIGN PATENT DOCUMENTS

JP 2004-220826 8/2004
WO 2010060932 6/2010

OTHER PUBLICATIONS

International Search Report and Written Opinion dated Apr. 29, 2013 for PCT/US11/42407.

(Continued)

*Primary Examiner* — Henry Yuen
*Assistant Examiner* — Hung D Nguyen

(57) ABSTRACT

A graphite electrode exhibits oxidation resistance by modifying the outer radial surface characteristics. The outer radial surface may be modified by providing a textured portion which improves water flow while minimizing water absorption. Alternately, a layer of flexible graphite or plurality of particles of exfoliated graphite may be disposed on the outer radial surface of the electrode body.

16 Claims, 6 Drawing Sheets

(56) References Cited

U.S. PATENT DOCUMENTS

| | | | |
|---|---|---|---|
| 1,425,603 A | 8/1922 | Mott | |
| 1,773,105 A | 8/1930 | Jones et al. | |
| 1,948,382 A | 2/1934 | Johnson | |
| 2,685,539 A | 8/1954 | Woodburn et al. | |
| 2,685,540 A | 8/1954 | Woodburn et al. | |
| 2,685,541 A | 8/1954 | Woodburn et al. | |
| 2,868,672 A | 1/1959 | Nickerson | |
| 2,897,102 A | 7/1959 | Fisher | |
| 2,906,632 A | 9/1959 | Nickerson | |
| 3,065,088 A | 11/1962 | Janes | |
| 3,174,872 A | 3/1965 | Fisher et al. | |
| 3,342,627 A | 9/1967 | Paxton et al. | |
| 3,348,929 A | 10/1967 | Valtscheva | |
| 3,351,477 A | 11/1967 | Wallouch | |
| 3,370,967 A | 2/1968 | Ellis | |
| 3,404,061 A | 10/1968 | Russell et al. | |
| 3,446,607 A | 5/1969 | Volk et al. | |
| 3,476,586 A | 11/1969 | Vaitcheva | |
| 3,503,118 A | 3/1970 | Criscione et al. | |
| 3,510,347 A | 5/1970 | Strater | |
| 3,553,010 A | 1/1971 | Rubisch Ottmar | |
| 3,706,596 A | 12/1972 | Wallouch | |
| 3,713,882 A | 1/1973 | DeBrunner et al. | |
| 3,993,503 A | 11/1976 | Ludwig | |
| 4,084,041 A | 4/1978 | Ludwig | |
| 4,104,417 A | 8/1978 | Sara | |
| 4,252,856 A | 2/1981 | Sara | |
| 4,347,083 A | 8/1982 | Sara | |
| 4,383,321 A * | 5/1983 | Schieber et al. | 373/88 |
| 4,402,744 A | 9/1983 | Sara | |
| 4,461,689 A | 7/1984 | Diepers | |
| 4,559,270 A | 12/1985 | Sara | |
| 4,567,103 A | 1/1986 | Sara | |
| 4,578,249 A | 3/1986 | Srinivasan et al. | |
| 4,715,042 A | 12/1987 | Engstrom | |
| 4,726,995 A | 2/1988 | Chiu | |
| 4,740,990 A * | 4/1988 | Radev et al. | 373/88 |
| 4,824,733 A | 4/1989 | Dallaire | |
| 4,979,998 A | 12/1990 | Chang | |
| 5,091,025 A | 2/1992 | Murakami et al. | |
| 5,143,749 A | 9/1992 | Coleman et al. | |
| 5,373,051 A | 12/1994 | Lewis et al. | |
| 5,413,816 A | 5/1995 | Sara | |
| 5,618,325 A | 4/1997 | Baniel | |
| 5,981,072 A | 11/1999 | Mercuri et al. | |
| 5,985,452 A | 11/1999 | Mercuri | |
| 6,706,400 B2 | 3/2004 | Mercuri et al. | |
| 6,864,007 B1 | 3/2005 | Iqbal et al. | |
| 2001/0038909 A1 | 11/2001 | Mercuri et al. | |
| 2002/0167109 A1 | 11/2002 | Klug | |
| 2005/0012894 A1 | 1/2005 | Ketelson et al. | |
| 2005/0254545 A1 | 11/2005 | Daimer | |
| 2006/0193364 A1 | 8/2006 | Shiraishi et al. | |
| 2006/0278287 A1 | 12/2006 | Fielden et al. | |
| 2008/0247440 A1 * | 10/2008 | Artman et al. | 373/88 |
| 2010/0136289 A1 | 6/2010 | Extrand et al. | |

OTHER PUBLICATIONS

Bojilov, Adrian, et al., Recent Development in the Production of Coated Electrodes, Technical Presentation, Oct. 20-21, 2011.

* cited by examiner

GRAPHITE ELECTRODES

This application is a continuation of U.S. application Ser. No. 13/580,997, which is a 35 U.S.C. 371 of PCT/US2011/042407, filed on Jun. 29, 2011, which claims the benefit of U.S. Provisional Application 61/360,822 filed Jul. 1, 2010, all with the title of Graphite Electrode. This application is entitled to the benefit of priority of such applications and the benefit is hereby claimed and is incorporated herein in its entirety by reference.

TECHNICAL FIELD

The present disclosure relates to a graphite article, e.g., graphite electrodes, and especially to improved resistance to oxidation of the graphite. More particularly, the disclosure concerns unique techniques for reducing oxidation of the graphite article, such as the graphite electrode, while the article is in use, for example when the electrode is on an electric arc furnace.

BACKGROUND ART

Graphite electrodes are used in the steel industry to melt the metals and other ingredients used to form steel in electrothermal furnaces. The heat needed to melt metals is generated by passing current through one or a plurality of electrodes, usually three, and forming an arc between the electrodes and the metal. Electrical currents in excess of 50,000 amperes are often used. The resulting high temperature melts the metals and other ingredients. Generally, the electrodes used in steel furnaces each consist of electrode columns, that is, a series of individual electrodes joined to form a single column. In this way, as electrodes are depleted during the thermal process, replacement electrodes can be joined to the column to maintain the length of the column extending into the furnace.

The melting of the metal may be brought about from an electrical arc between the scrap metal and the tip of the electrode column and the metal. As part of creating the arc, electrical current is built up in the electrode column and, in addition to the current being built up, heat is also built up in the electrode column as the current is accumulated. Additionally, heat may be given off from the molten bath of scrap metal. Still further, the arc itself generates large amounts of heat proximate to the electrode tip. With this build up of heat, the tip of the electrode column may be in the temperature range of over 3000° C.

In addition to the application of electricity, most furnaces include a chemical application to the bath such as but not limited to oxygen is a typical chemical component that is included in such application. With the tip of the column at the above described temperature and in the presence of oxidizing gases, this has a tendency to create an oxidizing environment in the furnace around the electrode column.

BRIEF DESCRIPTION

One embodiment disclosed herein includes a graphite electrode. The electrode has a graphite body having an axial direction and radial direction. The graphite body includes an outer radial surface. In this embodiment, preferably a majority of the outer surface has a textured surface in the axial direction. The surface is textured in such a way that upon the application of water to the textured surface, the water will exhibit at least one water droplet having a contact angle of no more than 90° measured after 10 seconds under controlled conditions of typical room temperature of about 25° C. or thereabout.

Another embodiment disclosed herein also includes a graphite electrode having a graphite body with an axial direction and a radial direction. The graphite body includes an outer radial surface. The outer radial surface may include a textured portion, the textured portion has a surface roughness of less than about 35 micro-inches.

Another embodiment disclosed herein also includes a graphite electrode having a graphite body with an axial direction and a radial direction. The graphite body includes an outer radial surface. The outer radial surface is textured in a way that, upon application of a water droplet to the textured portion, the water droplet is at least 50 percent of its original volume after 30 seconds.

Another embodiment disclosed herein also includes a graphite electrode having a graphite body with an axial direction and radial direction. The graphite body includes an outer radial surface. The electrode further includes at least one layer of flexible graphite sheet wrapped around at least a majority of the outer radial surface of the electrode.

A further embodiment includes a graphite electrode with a graphite body having an axial direction and radial direction and the graphite body having an outer radial surface. In this embodiment a mass of exfoliated graphite particles is adhered to the outer radial surface of the electrode in such an orientation that the particles which make up the mass are substantially distributed along at least a substantial portion of the outer radial surface of the electrode.

A further embodiment includes a graphite electrode having a graphite body having an axial direction and radial direction. The graphite body includes an outer radial surface that is modified such that, upon the application of water to the outer radial surface, the outer radial surface exhibits hydrophilic properties and the graphite body exhibits hydrophobic properties.

In addition to the above electrode embodiments, disclosed herein is a graphite article having an external surface covered with a flexible graphite mat. The graphite mat having one or more portions with a density of 0.5. g/cc or less. Types of graphite bodies which are considered herein include at least extruded graphite, isomolded graphite, molded graphite, fine grain graphite (having an average grain size of less than 50 microns), super fine grain graphite (having an average grain size of less than 10 microns), ultra fine grain graphite (having an average grain size of less than 5 microns), and combinations thereof.

Also disclosed is an embodiment in which the electrode has a surface which facilitates water flow down the electrode. In one particular embodiment, the electrode has a hydrophobic surface through the treatment of a chemical.

DETAILED DESCRIPTION OF THE PREFERRED EMBODIMENT

Figure 1:
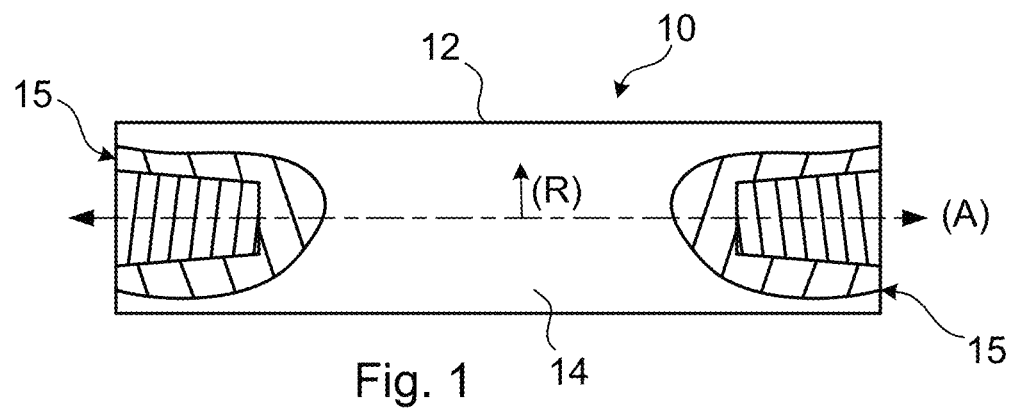
FIG. 1 is a side, partial cut-away view of an electrode.

Graphite electrodes can be fabricated by first combining a particulate fraction comprising calcined coke, pitch and, optionally, mesophase pitch or PAN-based carbon fibers into a stock blend. More specifically, crushed, sized and milled calcined petroleum coke is mixed with a coal-tar pitch binder to form the blend. The particle size of the calcined coke is selected according to the end use of the article, and is within the skill in the art. Generally, particles up to about 25 millimeters (mm) in average diameter are employed in the blend. The particulate fraction preferably includes a small particle size filler comprising coke powder. Other additives that may be incorporated into the small particle size filler include iron oxides to inhibit puffing (caused by release of sulfur from its bond with carbon inside the coke particles), coke powder and oils or other lubricants to facilitate extrusion of the blend.

Carbon fibers (when used) are preferably present at a level of about 0.5 to about 6 parts by weight of carbon fibers per 100 parts by weight of calcined coke, or at about 0.4% to about 5.5% by weight of the total mix components (excluding binder). The preferred fibers have an average diameter of about 6 to about 15 microns, and a length of preferably about 4 mm to about 25 mm, and most preferably less than about 32 mm.

Optionally, the fibers may be added after mixing of the particulate fraction and pitch has already begun. Indeed, in another embodiment, the fibers are added after at least about half the mix cycle has been completed, further fibers can be added after at least about three-quarters of the mix cycle has been completed. For instance, if the mixing of the particulate fraction and pitch takes two hours (i.e., a mix cycle is two hours), the fibers may be added after one hour, or even ninety minutes, of mixing. Adding the fibers after the mixing has begun will help preserve fiber length (which can be reduced during the mixing process) and thereby the beneficial effects of the inclusion of fibers, which are believed to be directly related to fiber length.

As noted above, the particulate fraction can include small particle size filler (small is used herein as compared to the particle size of the calcined coke, which generally has a diameter such that a major fraction of it passes through a 25 mm mesh screen but not a 0.25 mm mesh screen, and as compared to the fillers conventionally employed). More specifically, the small particle size filler comprises at least about 75% coke powder, by which is meant coke having a diameter such that at least about 70% and more advantageously up to about 90%, will pass through a 200 Tyler mesh screen, equivalent to 74 microns.

The small particle size filler can further comprise at least about 0.5% and up to about 25% of other additives like a puffing inhibitor such as iron oxide. Again, the additive may also be employed at a particle size smaller than that conventionally used. For instance, when iron oxide is included, the average diameter of the iron oxide particles should be such that they are smaller than about 10 microns. Another additional additive which can be employed is petroleum coke powder, having an average diameter such that they are smaller than about 10 microns, added to fill porosity of the article and thus enable better control of the amount of pitch binder used. The small particle size filler should comprise at least about 30%, and as high as about 50% or even 65% of the particulate fraction.

After the blend of particulate fraction, pitch binder, etc. is prepared, the body is formed (or shaped) by extrusion though a die or molded in conventional forming molds to form what is referred to as a green stock. The forming, whether through extrusion or molding, is conducted at a temperature close to the softening point of the pitch, usually about 100° C. or higher. The die or mold can form the article in substantially final form and size, although machining of the finished article is usually needed, at the very least to provide structure such as threads. The size of the green stock can vary; for electrodes the diameter can vary between about 220 mm and 900 mm.

After extrusion, the green stock is heat treated by baking at a temperature of between about 700° C. and about 1100° C., more preferably between about 800° C. and about 1000° C., to carbonize the pitch binder to solid pitch coke, to give the article permanency of form, high mechanical strength, good thermal conductivity, and comparatively low electrical resistance, and thus form a carbonized stock. The green stock is baked in the relative absence of air to avoid oxidation. Baking should be carried out at a rate of about 1° C. to about 5° C. rise per hour to the final temperature. After baking, the carbonized stock may be impregnated one or more times with coal tar or petroleum pitch, or other types of pitches or resins known in the industry, to deposit additional coke in any open pores of the stock. Each impregnation is then followed by an additional baking step.

After baking, the carbonized stock is then graphitized. Graphitization is by heat treatment at a final temperature of between about 2500° C. to about 3400° C. for a time sufficient to cause the carbon atoms in the coke and pitch coke binder to transform from a poorly ordered state into the crystalline structure of graphite. Advantageously, graphitization is performed by maintaining the carbonized stock at a temperature of at least about 2700° C., and more advantageously at a temperature of between about 2700° C. and about 3200° C. At these high temperatures, elements other than carbon are volatilized and escape as vapors. The time required for maintaining the electrode at the graphitization temperature using the process disclosed herein can be no more than about 18 hours, in some instances no more than about 12 hours. In further instances, graphitization may be for about 1.5 to about 8 hours. Once graphitization is completed, the finished electrode body can be cut to size and then machined or otherwise formed into its final configuration.

With reference now to FIG. 1, a graphite electrode is shown and generally indicated by the numeral 10. Electrode 10 includes a main body 12, preferably constructed from graphite formed in accordance with the description above. Body 12 is generally cylindrical having an axial direction represented by arrow A and a radial direction represented by arrow R. Body 12 further includes a radial outer surface 14 and opposed end faces 15. End faces 15 are typically used to provide a means of connecting one electrode to another, and are therefore not exposed to the same severe oxidation conditions as the outer surface 14.

Figure 2:
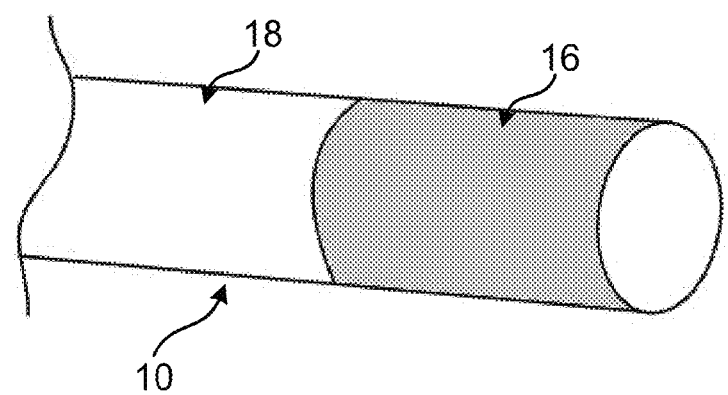
FIG. 2 is a perspective view of an electrode having both a textured surface and a conventional surface.

As shown in FIG. 2, according to one embodiment, outer surface 14 may have a textured portion 16 and a non-textured portion 18. According to one embodiment, the majority of a radial outer surface 14 is textured. According to still another embodiment, substantially all of radial outer surface 14 is textured. According to a further embodiment, textured portion 16 has a surface such that upon the application of water to the textured surface, the water will exhibit at least one water droplet having a contact angle of no more than about 90°. In a further embodiment the contact angle may be no more than 85°. Preferably the contact angle may be any angle less than 90° to more than 0°.

According to another embodiment, textured portion 16 has a surface such that upon the application of a water droplet to the textured surface, the water droplet volume, after 30 seconds is at least 50 percent of the original volume. In a further embodiment, the water droplet volume after 30 seconds is at least 70 percent of the original volume. In a further embodiment, the water droplet volume after 30 seconds is at least 80 percent of the original volume. According to still another embodiment, the water droplet volume after 40 seconds is at least 40 percent of the original volume. According to still another embodiment, the water droplet volume after 40 seconds is at least 50 percent of the original water droplet volume. According to still another embodiment, the water droplet volume after 40 seconds is at least 60 percent of the original water droplet volume. According to still another embodiment, the water droplet volume after 90 seconds is at least 20 percent of the original volume. According to still another embodiment, the water droplet volume after 90 seconds is at least 50 percent of the original water droplet volume. According to still another embodiment, the water droplet volume after 90 seconds is at least 70 percent of the original water droplet volume. The conditions for measuring the volume change may be at room conditions, that being about 25° C. and about 50% or less relative humidity. In another embodiment, the afore properties are measured at ambient conditions.

Figure 3:
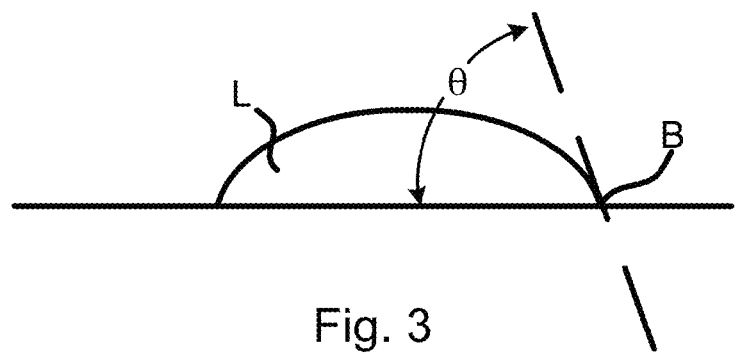
FIG. 3 is a side view showing a water droplet and contact angle.

With reference now to FIG. 3, the contact angle θ, is the angle formed by a liquid (L) at the three phase boundary where the liquid, gas, and solid intersect. The contact angle θ depends on the interfacial tensions between the gas & liquid, liquid & solid, and gas & solid. Contact angle θ may be measured, for example, by a goniometer which measures a droplet's contact angle using the assumption that the droplet fits the geometry of a sphere, ellipsoid, or the Young-Laplace equation. According to one embodiment, the contact angle is measured at about 25° C.

Techniques that may be used to create textured portion 16 include at least one of etching, polishing, machining, buffing, sanding and combinations thereof. In a certain particularly preferred embodiment, the textured portion 16 is textured by polishing to promote flow of the water in the axial direction down the column. In another embodiment, the texture may be applied in the axial direction. For example, a sanding or polishing stroke may be applied in an axial direction along the outer radial surface.

Figure 12:
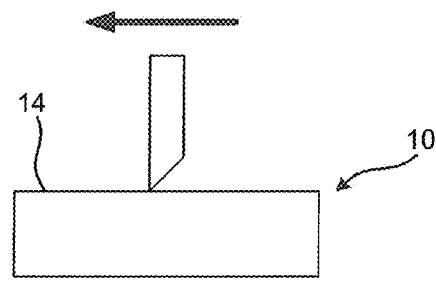
FIG. 12 is a partial view of a section of an outer surface of an electrode having a textured outer surface in accordance with an embodiment disclosed herein.

Further techniques may be used to form textured surface portion 16. In another embodiment a tool is used to scrape outer surface 14 of electrode 10. Surface 14 is scraped in the axial direction from the end face designated for the top of the electrode to the end face designated as the bottom of electrode 10. The top and bottom of the electrode is relative to how the electrode is oriented while in use as part of an electrode column. In one embodiment the scraping may form a notched grain pattern along surface 14, with the teeth extending in a downward direction as shown in FIG. 12.

In another embodiment, surface 14 may be scraped in a manner to facilitate the flow of liquid down surface 14 of electrode 10, while electrode 10 is in service as part of an electrode column. Furthermore, surface 14 may be scraped in a manner to increase either or both of the flow of water down surface 14 of electrode 10 or the speed at which the water travels down surface 14 of electrode 10.

As stated above and herein water is used just as an exemplary embodiment of a cooling liquid. The disclosed embodiments are not limited to the use of water as the cooling liquid. Other fluids may be used as the cooling liquid than water or water may be used in conjunction with other compounds. For example the cooling liquid, such as water, may include a surfactant. An example of a surfactant may include soap.

In another additional embodiment, textured portion 16 of the electrode 10 is formed by the application of a chemical to surface 14 of electrode 10. In one particular aspect of this embodiment, the chemical may be a carbon cement which is graphitizable. In another particular embodiment, the chemical may be a pitch. Exemplary pitches include either an impregnation pitch, a binder pitch, or any other types of graphitizable pitch. These various embodiments of chemicals may be used in any combination thereof. The chemical may be applied in a wetting process, such as by dipping or rolling electrode 10 in a bath of the chemical or by an impregnation process. Prior to application of the chemical to surface 14, electrode 10 is preferably graphitized. Optionally, the connecting technology may or may not have been machined into electrode 10 prior to application of the chemical. In one certain embodiment, electrode 10 has exhibited its desired density prior to application of the chemical.

The chemical of the afore embodiment is not limited to pitch or the carbon cement. Any hydrophobic material may be used as the chemical.

In a preferred example of this embodiment, once the chemical is applied to surface 14 of electrode 10 and the chemical is optionally cured, if appropriate for the particular chemical, surface 14 of electrode 10 is not further processed. For example in this embodiment, if the chemical is pitch, prior to use of electrode 10 with a surface 14 which has been treated with pitch, it is preferred that electrode 10 is not subject to any heating step which would carbonize the pitch prior to electrode 10 being added to an electrode column.

In another embodiment, a surface roughness of textured portion 16 may be less than about 35 micro-inches, in a further embodiment less than about 30 micro inches; in an additional embodiment less than about 25 micro-inches; and in another embodiment less than 20 micro-inches. In a certain embodiment, the surface roughness of portion 16 may be about 15 micro-inches or less.

A Phase II TR100 Surface Roughness Tester ("Tester") may be used to determine the surface roughness. In one particular embodiment, the surface roughness is determined by using the Tester on more than one location of textured portion 16. In one embodiment, the Tester may use a root-mean square ("RMS") algorithm to calculate the surface roughness. However, any suitable algorithm maybe used to calculate the surface roughness. A non-limiting example of another such algorithm is an arithmetic mean.

As for the cooling liquid, A.K.A. water, the cooling liquid may be applied to surface 14 of electrode 10 in any preferred manner. In one embodiment, the liquid is sprayed onto surface 14 at more than one circumferential point, typically four (4) or more points. In a further embodiment, atomizing nozzles may be used to apply the cooling liquid to electrode 10. In another embodiment, the cooling liquid may be applied to electrode 10 in a mist pattern or a fan like pattern.

Figure 4:
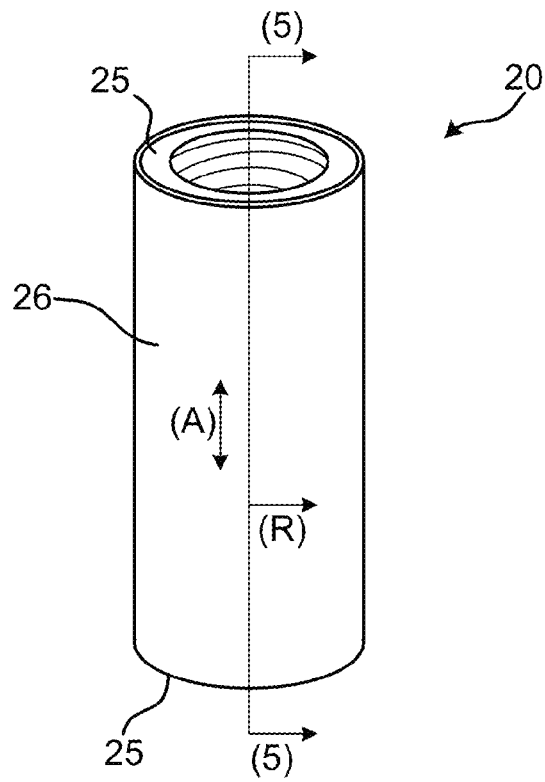
FIG. 4 is a perspective view of an electrode with a flexible graphite shell.
Figure 5:
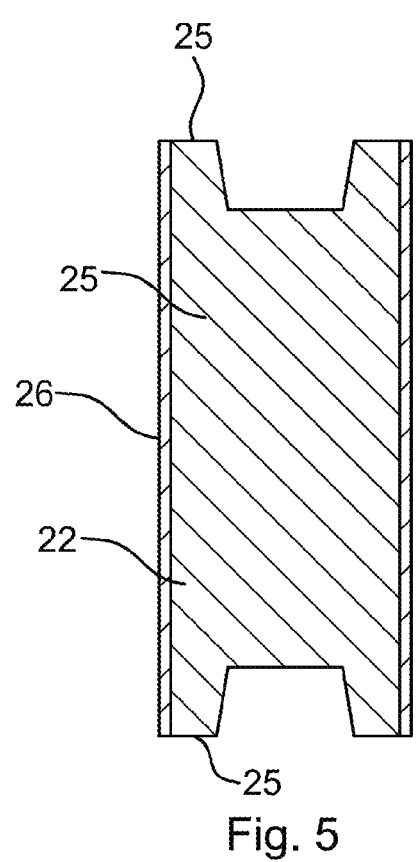
FIG. 5 is a section view along 5-5 of FIG. 4.

With reference now to FIGS. 4 and 5, an electrode 20 is shown according to another embodiment. Electrode 20 includes a graphite body 22 having an axial direction (A) and radial direction (R). Graphite body 22 includes an outer radial surface 24 and opposed end faces 25. Instead of a textured portion, or along with the textured portion, electrode 20 includes one or more layers of flexible graphite 26 disposed around at least a majority of outer radial surface 24 of electrode 20. According to one embodiment, flexible graphite layer(s) 26 may be formed from a unitary sheet of flexible graphite. According to another embodiment, flexible graphite layer(s) may be formed from a plurality of sheets of flexible graphite.

In embodiments including a plurality of flexible graphite sheets, the flexible graphite sheets may be formed from the same starting material or from different starting materials. In one embodiment, a sheet of flexible graphite is formed from a compressed and/or calendered mass of exfoliated particles of natural graphite. One exemplary technique for making flexible graphite is disclosed in U.S. Pat. No. 3,404,061 which is hereby incorporated by reference in its entirety. In another embodiment, a sheet of flexible graphite can be formed from polyimide film, such as described in U.S. Pat. No. 5,091,025 which is hereby incorporated by reference in its entirety. Combinations of the aforementioned types of flexible graphite may be used together. One source for the above flexible graphite from intercalated and exfoliated particles of natural graphite is GrafTech International Holdings Inc. Optionally, graphite layer(s) 26 may include an antioxidant incorporated into the one or more graphite sheet(s). The antioxidant may be incorporated into such sheet during production of the sheet.

Figure 6A:
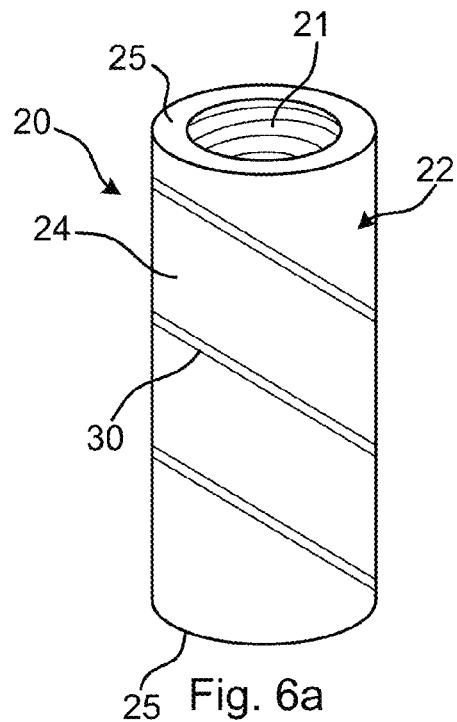
FIG. 6A-6B shows a process of making an electrode in accordance with an embodiment disclosed herein.
Figure 6B:
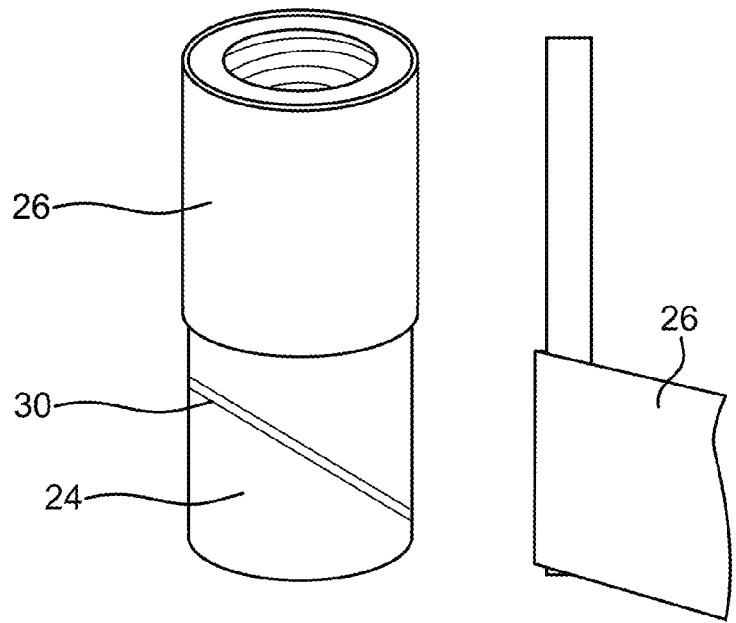

With reference now to FIGS. 6A-6B, electrode 20 may be formed in the following manner. As shown in FIG. 6A, graphite body 22 is formed according to the methods described above. After the graphite body 22 is formed, connecting elements 21 may be machined at one or both end faces 25. Any known connecting technique such as socket (as shown) or a tang may be machined into end face 25 of graphite body 22.

Figure 7A:
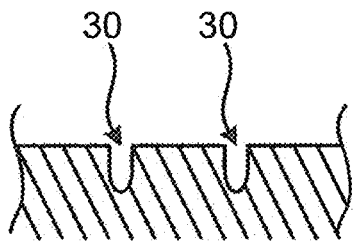
FIGS. 7A-7B are partial alternate embodiments of features that may be added to an embodiment of an electrode disclosed herein.

Optionally, a surface adherence treatment may be applied on outer radial surface 24 to promote adherence of the flexible graphite 26 to the electrode body 22. As shown in FIG. 6A, the surface adherence treatment may include one or more slats 30 (see FIG. 7A) cut into outer surface of 24 of electrode 20. Slats 30 may be generally elongated U-shaped in cross-section and may extend axially, circumferentially, or in a spiral pattern. Preferably slats 30 are disposed along the entire outer radial surface 24 which layer 26 is to be disposed. More preferably both slats 30 and layer 26 are disposed along at least a majority of outer radial surface 24, and even more preferably substantially all of the outer radial surface 24.

Figure 7B:
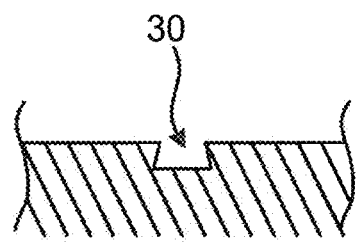

As shown in FIG. 7B, the slats 30 may alternately be a dovetail cut. The dovetail cut may, for example, be 60 degrees and ⅛ inch by 0.055 inches, four per side. In another embodiment, the dovetail may be 3/16 inches by 0.090 inches. In yet another embodiment, the dovetail may be 3/16 inches by 0.055 inches. The dovetail cut is not limited to any particular dimensions. Furthermore the surface adherence treatment is not limited to only those shapes illustrated in FIGS. 7A and 7B. Any shape that may be used to enhance adherence of layer 26 to outer surface 24 may be used. Still further, any combination of shapes and cut patterns may be used. For example, a plurality of slats 30 may be equally spaced and cut in the axial direction or a plurality of slats 30 are equally spaced and being cut in a spiral direction.

In another embodiment, outer surface 24 of electrode 20 includes a plurality of slots. One or more of the slots, in some cases all slots, are designed to allow graphite sheet 26 to mechanically lock to outer surface 24 of electrode 20.

In an embodiment, the slots, grooves, etc. have a depth of at least about 0.005", optionally, the slots, grooves, etc. may have a depth of no more than 0.250". In a further embodiment, the depth of the slots, grooves, etc. are no more than about 0.06% to about 2.5% of the radius electrode 20. As applied to electrode 20, mat 26 may have a thickness of at least about 1/32", preferably at least about 1/16", more preferably at least about ⅛", even more preferably at least about ¼". For a given embodiment, in terms of slot depth, the thickness of mat 26 on electrode 20 may range from 12.5% to 5000% of the depth of the slot.

Any or all of the above slats, slots, grooves, etc in any of the above embodiments many be disposed in a spiral manner, length-wise manner, substantially vertical, substantially horizontal manner, non-curved manner of surface 24, or any combination thereof. Alternatively, if the embodiment includes slat, slot, groove, etc. in a spiral manner, electrode 20 may include one (1) such slat, slot, or groove or more than one (1). In one particular embodiment, the frequency of slots 30 is no more than four (4) per linear inch of circumference of surface 24 of electrode 30. In another embodiment of surface 24 may include one (1) slot 30 for each three (3) linear inches of circumference of surface 24 of electrode 20. In further embodiments, the number of slots 30 around circumference of electrode 20 may be uniform or may vary. In a further embodiment, the distance between adjacent slots 30 may be uniform or may vary. In a particular embodiment, the distance between adjacent slots 30 may be no more than about ¼" up to about 3".

After the optional surface adherence treatment, an adhesive may be applied to outer radial surface 24 prior to the application of flexible graphite 26. An adhesive is used here in a general sense. As used herein the adhesive may include a cement which is used for the bonding of carbon and/or graphite blocks together. Preferably the adhesive is carbonizable and further graphitizable. Alternatively, the adhesive may be a filled adhesive. Examples of preferred types of fillers include particles of carbon and/or graphite. In a further embodiment not shown, before or after the application of the adhesive, an antioxidant may be applied to outer radial surface 24 of electrode 20. In one particular embodiment, the antioxidant may be in the form of a powder. A non-limiting example of suitable antioxidants includes at least the following: phosphate, silicon carbide, boron nitride, titanium carbide, titanium dioxide, alumina, aluminum silicate, magnesium oxide, molybdenum silicide and combinations thereof.

With reference now to FIG. 6B, after the surface adherence treatment and or adhesives are applied, the flexible graphite layer 26 may be applied to the outer radial surface 24 of electrode 20. As discussed above, if the use of an antioxidant is desired, the antioxidant may be incorporated into one or more of the flexible graphite sheets 26 and/or applied to outer surface 24.

In one particular embodiment of electrode 20, the overall thickness of the flexible graphite 26 is no more than about one-third (⅓) the diameter of electrode 20. In a further embodiment, the thickness of the flexible graphite 26 is no more than about two (2") inches. Preferably, each flexible graphite sheet has a density of no more than about 2.0 g/cc or less, and more preferably no more than about 1.6 g/cc or less, even more preferably no more than 1.2 g/cc. In a further embodiment a sheet has a density of about 1.0 g/cc or less.

In another particular embodiment, thickness of at least one, up to all sheets of the graphite mat is no more than ½"; further embodiment no more than ⅓", and an even further embodiment no more than ¼".

In an additional embodiment, at least one, up to all, the sheets of the graphite mat have at least one portion of the sheet having a density of no more than 0.5 g/cc, further no more than 0.45 g/cc, even further no more than 0.4 g/cc, even more further no more than 0.3 g/cc, and lastly no more than 0.2 g/cc. In a further embodiment, the graphite mat includes at least a plurality of portions having a density of no more than 0.5 g/cc, preferably less than 0.5 g/cc, even more preferably less than 0.4 g/cc. In certain embodiments, at least prior to application of the graphite mat to electrode 20 at least a majority, if not all, of the mat has a density of 0.5 g/cc or less, preferably 0.4 g/cc or less. The above density numbers are exemplary and all numbers in between the examples disclosed herein should be considered disclosed.

For the any particular embodiment which uses multiple sheets of the graphite mat, the densities of various sheets used may be mixed or matched in any combination of the above embodiments.

In a particularly preferred embodiment, the graphite mat (A.K.A. sheet) is a low density graphite sheet which forms the outer protective layer on the electrode body 20. In this embodiment, the low density graphite mat has a density of 0.5 g/cc or less in at least one or more portions, preferably the entire sheet. In a more preferred embodiment the low density graphite sheet has a density of 0.2 g/cc or less. In still other embodiments the low density graphite sheet has a density of 0.1 g/cc or less. In still other embodiments, the low density graphite sheet is from between 0.05 and 0.3 g/cc. In still other embodiments, the low density graphite sheet is from between 0.1 and 0.2 g/cc. In one embodiment, the low density graphite sheet is less than ¾" inches thick. In another embodiment the low density graphite sheet is less than ½" inches thick. In one embodiment the low density graphite sheet is between ¼" and ¾" inches thick. In another embodiment, the low density graphite sheet is between 0.4 and 0.6 inches thick. In a particularly preferred embodiment, the low density graphite sheet is about ½" inches thick and has a density of about 0.1 g/cc.

In further embodiments, the graphite mat described above may have a density of no more than about 0.4 g/cc. A non-limiting example of a lower limit for density may be about 0.05 g/cc or more, further no less than 0.1 g/cc. All densities in between 0.4 g/cc and 0.05 g/cc may be used to practice the disclosed embodiments. Examples of such densities include 0.38 g/cc or less, 0.35 g/cc or less, 0.28 g/cc or less, 0.24 g/cc or less, 0.18 g/cc or less, and 0.15 g/cc or less.

The low density graphite sheet described above may be characterized as being compressible and deformable. Thus, the density and thicknesses described above are illustrative of the properties/dimensions prior to application to the graphite electrode. In one embodiment, the low density graphite sheet is compressed onto graphite body 20. Thus, during attachment to the graphite body 20, the low density graphite sheet is deformed and compressed. In one embodiment, the low density graphite sheet is compressed to less than half the original thickness. In other embodiments, the low density graphite sheet is compressed to less than ¼ of the original thickness. In still other embodiments, the low density graphite sheet is compressed to less than ⅛ of the original thickness at its thinnest point. When the low density graphite sheet is compressed onto the electrode the density is increased. Thus, in one embodiment, after compression onto electrode body 20, the low density graphite sheet is twice the original density. In still other embodiments, after compression onto electrode body 20, the low density graphite sheet is four times the original density. In still other embodiments, after compression onto electrode body 20, the low density graphite sheet is 8 times the original density. In these or other embodiments the low density graphite sheet, after compression onto the electrode body 20, has a at least one portion of the sheet has a density of no more than about 1.0 g/cc. In other embodiments, the density of at least a portion of the compressed mat may be no more than 0.8 g/cc, preferably no more than 0.5 g/cc. In still other embodiments, the low density graphite sheet, after compression onto the electrode body 20, has a density of less than 0.4 g/cc.

In the case that the afore mentioned slats, slots, or grooves are used to assist with adhering mat 26 to body 20, the density of mat 26 may vary along the circumference of electrode 20. For instances, for that portion of graphite mat disposed in the slots, etc, mat 26 when compressed onto electrode 20 will have a lower density when compared to portions of mat 26 compressed along the exterior surface of electrode 20 which does not include the afore slots, etc.

In another embodiment, the density of mat 26 when compressed around electrode 20 may vary. Such density may vary uniformly or randomly.

In this manner, the compressed low density graphite sheet is deformed and secured to the electrode body. It should be appreciated that, if the electrode body 20 includes slats or dovetails 30 described above, or other surface features, the low density graphite sheet may at least partially enter or be received in the slats 30. This improves the mechanical attachment between the electrode body 20 and the low density graphite sheet. In these or other embodiments, adhesives may be provided between the low density graphite sheet and the electrode body. Further, antioxidant coatings may be provided between the graphite sheet and the electrode body 20 prior to attachment thereto.

Figure 10:
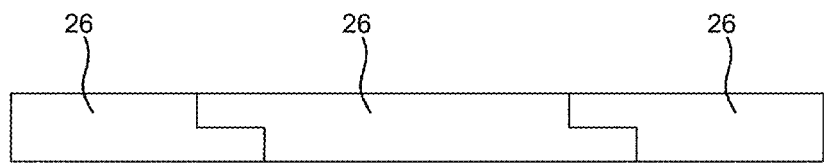
FIG. 10 is a side view of an embodiment of a sheet of compressed particles of exfoliated graphite.
Figure 11:
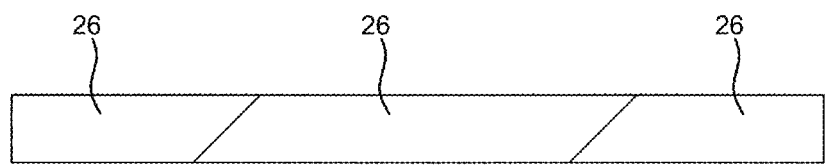
FIG. 11 is a schematic side view of a second embodiment of a sheet of compressed particles of exfoliated graphite.

In a certain embodiment of sheet 26, the edges of sheet 26 include a rabbet joint, as shown in FIG. 10. In this embodiment, it is preferred that each edge section of sheet 26 that will be adjacent another edge section of sheet 26 on electrode 20 mates to each other by the use of mating rabbet joints. In another certain embodiment, instead of using the rabbet cuts, the mating edge sections may be mitered as shown in FIG. 11. Any type of spliced joint between adjacent edge sections of sheet 26 is within the scope of the embodiments described herein. Further, any jointing or arrangement of the edge sections of mat 26 which allow the edge sections to mate but do not result in the mating portions having a thickness of greater than the thickness of sheet 26 is within the scope of what is defined herein. In another alternative embodiment, adjacent edge sections of sheet 26 butt up to one another. In a further alternative embodiment, edge sections of sheet 26 may overlap each other.

Alternatively instead of using the afore graphite mat, sheets of graphitized polyimide may be used or further alternatively, sheets of graphite mat and graphitized polyimide in combination or a composite of the graphite mat and graphitized polyimide sheet.

In a further alternate embodiment, instead of wrapping graphite mat 26 around the graphite electrode body 22, a plurality of particles of exfoliated graphite are disposed along the outer radial surface 24 of the electrode to form an exfoliated graphite layer. According to one embodiment, the plurality of exfoliated graphite particles is compressed against the electrode body 24 to adhere the particles thereto and form the exfoliated graphite layer. Preferably the exfoliated graphite layer covers at least a substantial portion of the radial outer surface 24. Optionally, the electrode 20 may include an antioxidant layer on the radial outer surface 24 of the electrode. In an alternate embodiment, the antioxidant is incorporated into sheet 26 or the bed of particles to be applied to outer radial surface 24. In addition or in place of the antioxidant a surfactant may be incorporated into sheet 26 or the bed of particles to be applied to outer radial surface 24.

Relative to the antioxidant, another embodiment may include the use of alternating around surface 24 of electrode 20 a surface of an antioxidant and then a sheet of graphite mat 26 or vice versa. In one embodiment, a sheet of graphite mat 26 is applied to surface 24 of electrode 20. Then a layer of antioxidant may be applied to the outer surface of sheet 26. The application of sheets 26 and layers of antioxidant may be repeated as many times as desired by the user. In a variation of this embodiment, the layer of antioxidant may be applied first instead of sheet 26, and then the sheet 26. In this variation, the antioxidant layers and sheets 26 may be applied as many times as desired also.

It should be appreciated that the addition of exfoliated graphite and/or flexible graphite layers to the electrode core 22 may be performed to increase the diameter of the electrode 20. For example, a 30 inch diameter electrode may be made using a 26 inch diameter graphite electrode body 22 and by applying a two inch layer of exfoliated graphite and/or graphite mat 26. In a further example, a 32 inch diameter or greater electrode may be made using a 30 inch diameter graphite electrode body 22, by adding sufficient numbers of layers to increase the overall diameter of the composite article to a desired amount such as 32 inches in diameter in this instance. In this manner, the range of available electrode sizes may be expanded.

Figure 8:
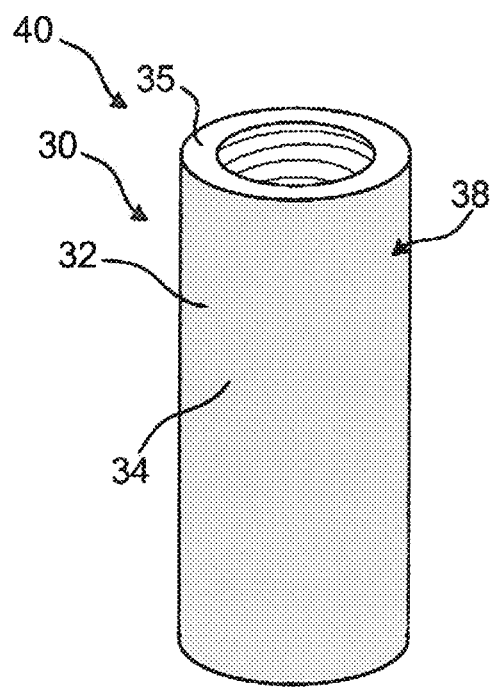
FIG. 8 is a perspective view of an electrode having an anti-oxidant coating on the outer radial surface thereof.

With reference now to FIG. 8, an electrode 40 is shown according to another embodiment of the invention. Electrode 40 includes a graphite body 32 having an axial direction (A) and radial direction (R). Graphite body 32 includes an outer radial surface 34 and opposed end faces 35. An antioxidant coating 38 is applied to at least a substantial portion of the outer radial surface 34, and preferably substantially all of the outer radial surface 34. A non-limiting example, suitable antioxidants include phosphate, silicon carbide, boron nitride, titanium carbide, titanium dioxide, alumina, aluminum silicate, magnesium oxide, molybdenum silicide and combinations thereof. In one embodiment, the coating 38 comprises an electrically conductive material. In another embodiment, the antioxidant coating 38 may be adhered to the outer surface by the use of an adhesive. The adhesive may be the same as the adhesive described above. The antioxidant coating 38 may further include particles of exfoliated graphite if so desired. In one particular embodiment, the antioxidant 38 comprises a powder applied to the outer surface of electrode 40.

In one embodiment disclosed herein the electrode includes a radial outer surface that is modified such that, on the application of water to the surface of the electrode, will exhibit hydrophilic properties and the body of the electrode may exhibit one or more characteristics commonly associated with a hydropobic body. In a particular embodiment, hydrophilic is used to mean the water droplet will have an appearance traditionally associated with a surface which is wetted. Additionally, the term hydrophobic as used herein means at least the body of the electrode does not absorb water as much as compared to an electrode with a conventional surface. In a further embodiment, the electrode does not include any coatings or layers applied to the outer surface of the electrode.

In combination with one or more of the above embodiments, or independently therefrom, the electrode may be cooled using water having an additive therein. In one embodiment, the additive is a surfactant to promote the flow of water down the electrode. In another embodiment, the additive is an antioxidant. Suitable antioxidant additives may include, for example, metals (or semi-metals) and their corresponding carbides, phosphates, oxides, nitrides, silicates or silicides in an aqueous solution, colloid or slurry. These antioxidant additives may be added to water in concentrations of up to 50 percent by weight. In still other embodiments up to 30 percent by weight. And in still other embodiments up to 10 percent by weight.

In a particular embodiment, magnesium hydroxide $Mg(OH)_2$ is added to the cooling water to form a slurry. In this embodiment the magnesium hydroxide may be up to 10 percent by weight of the slurry. In another embodiment, the magnesium hydroxide is up to 30 percent by weight of the slurry. In still other embodiments the magnesium hydroxide is up to 50 percent by weight of the slurry. In still other embodiments, the magnesium hydroxide is up to 68 percent by weight of the slurry. In still other embodiments, the magnesium hydroxide is between 20 and 40 percent by weight of the slurry. In still other embodiments, the magnesium hydroxide is between 25 and 35 percent by weight of the slurry. As the slurry mixture contacts and runs down the electrode, it decomposes, losing water and leaving magnesium oxide MgO on the electrode surface. The magnesium oxide may reduce electrode oxidation. Further, as is known in the art, magnesium oxide is commonly added during heats, and thus, the above method may be an improved technique to add magnesium oxide to the slag in the furnace.

In addition to graphite electrodes, the concepts disclosed herein are also applicable to other types of graphite articles such as at least extruded graphite, isomolded graphite, molded graphite, fine grain graphite (having an average grain size of less than about 50 microns to about 10 microns), super fine grain graphite (having an average grain size of less than about 10 microns to about 5 microns), ultra fine grain graphite (having an average grain size of less than 5 microns, e.g., 4 microns or less), and combinations thereof. The flexible graphite applied to one or more surfaces of the graphite article may include flexible graphite sheets or graphite mat as described above. In alternative embodiment, particles of exfoliated graphite (A.K.A. expanded graphite) may be applied to such outer surfaces as discussed above.

In one—embodiment, a room-temperature coefficient of thermal expansion (hereinafter "CTE") of the graphite material affects the life and ease of silicon removal for silicon production applications and is therefore particularly consequential in the direction perpendicular to solidification (i.e. in the plane parallel to the bottom wall). Thus, if extruded stock is the base material, the against-grain CTE is of particular consequence. However, if molded stock is the base material, the with-grain CTE is of particular consequence. In one embodiment, the graphite material has a coefficient of thermal expansion perpendicular to the solidification direction that is less than 95% of the CTE of the silicon processed therein (CTE of Si at room temperature is about $3.5 \times 10^{-6}/°$ C.). Even more advantageously, the graphite material has a CTE in the direction perpendicular to solidification of less than 85% of the CTE of the silicon processed therein. Still more advantageously, the graphite material has a CTE in the direction perpendicular to solidification of less than 75% of the silicon processed therein. In these or other embodiments the graphite materials exhibit a CTE in the direction perpendicular to solidification of from about $1.0 \times 10^{-6}/°$ C. to about $3.0\times10^{-6}/°$ C. In another embodiment, the CTE in the direction perpendicular to solidification is from about $2\times10^{-6}$ PC to about $2.5\times10^{-6}/°$ C.

Advantageously in an embodiment, the graphite material has a thru-plane (i.e. parallel to heat flow and solidification) thermal conductivity of from about 80 to about 200 W/m·K at room temperature. In other embodiments, the thermal conductivity is from about 90 to about 160 W/m·K at room temperature. In other embodiments, the thermal conductivity is from about 120 to about 130 W/m·K at room temperature.

In a certain embodiment, the graphite material has a with-grain compressive strength of from between 15 and 22 MPa. In other embodiments, the with-grain compressive strength is from between about 17 and about 20 MPa. In this or other embodiments, the against-grain compressive strength is advantageously between about 17 and about 24 MPa. In other embodiments, the against-grain compressive strength is from between about 19 and about 21 MPa.

In one embodiment, the graphite material advantageously exhibits a gas permeability of less than about 0.01 Darcy. Even more advantageously, the graphite material exhibits a gas permeability of less than about 0.005 Darcy. Still more advantageously, the graphite material exhibits a gas permeability of less than about 0.002 Darcy. The relatively low permeability of the graphite material provides added safety and improved life should a failure or degradation.

An advantage of one or more of the above embodiments is that the electrode disclosed herein should exhibit improved resistance to oxidation during use.

Figure 13:
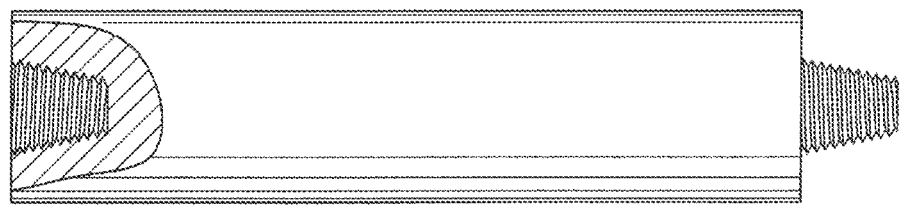
FIG. 13 is a schematic view of a pinless electrode.

It will be recognized by the skilled artisan that the above described techniques may apply to both pin-socket (FIG. 1) type electrodes as well as pinless (FIG. 13) electrodes. The size of the above described electrodes may typically range from about 220 mm to up to about 800 mm in nominal diameter. The above techniques may be applied to an electrode of any length.

EXAMPLES

Example 1

A control sample was prepared by cutting a commercially available graphite electrode (GrafTech International Holdings Inc.) into a cube measuring 2 inches on a side. Nine equally spaced, ⅛-inch deep grooves were machined into each side of the cube. The sample cube was weighed prior to placing in a high temperature furnace. With an air flow rate of 9 L/min, the sample was heated from room temperature to 1600° C. at a rate of 10° C./minute, then held at 1600° C. for 30 minutes, after which time the oven was turned off and allowed to cool to room temperature. The sample was reweighed, and the mass loss of the control sample was calculated to be 34%.

A second graphite cube was cut and measured 2 inches on a side. The second cube had nine equally spaced, ⅛-inch deep grooves machined into each side of the cube. A pre-formed sheet of expanded graphite measuring 1.875-inch square by ½ inch thick was placed on two opposing faces of the cube. The sheet of expanded graphite had a weight per unit area of 0.14 g/cm2, giving an original mat density of about 0.16 g/cm3. The sheet was compressed onto the surface and into the grooves of the graphite cube using a laboratory press delivering 500 psi. The remaining sides of the second cube were coated with compressed expanded graphite in the same manner. The sample was weighed and heated as in the first cube. The mass loss of the sample was 28%.

A third graphite cube was cut and measured 2 inches on a side. The third cube had nine equally spaced, ⅛-inch deep grooves machined into each side of the cube. Prior to compression of the expanded graphite sheet, 0.5 g of silicon carbide powder was distributed on each face of the cube. Thereafter, a pre-formed sheet of expanded graphite measuring 1.875-inch square by ½ inch thick was placed on two opposing faces of the cube. The sheet of expanded graphite had a weight per unit area of 0.14 g/cm2, giving an original mat density of about 0.16 g/cm3. The sheet was compressed onto the surface and into the grooves of the graphite cube using a laboratory press delivering 500 psi. The remaining sides of the third cube were coated with compressed expanded graphite in the same manner. The sample was weighed and heated as in the first cube. The mass loss of the sample was 24%.

Example 2

Samples were prepared by cutting commercially available graphite electrodes (GrafTech International Holdings Inc.) having unmodified surfaces into one-inch square samples for testing. The original outer surface of the electrodes was clearly marked as the surface to be tested. Samples were also hand-sanded or mechanically polished according to various methods. A first polished sample was polished using 80 grit paper then a scotch pad 47R94 Fine. A second polished sample was polished using 80 grip paper then scotch pad 42R18 Mid, then crocus paper. A third polished sample was polished using 80 grit paper, then scotch pad 47446 Rough, then crocus paper. Finally, a fourth polished sample ("Polished #4") was polished using 80 grit paper, then 320 grit paper then 600 grit paper, then crocus paper. The surface roughness of the samples was determined using a Phase II TR100 Surface Roughness Tester. The contact angle formed by the interaction of a water droplet of fixed size with the electrode surface was measured by known techniques. In addition, the amount of water absorbed into the sample surface was measured using a CAM-PLUS Film Meter. The results are provided in the table below:

| Surface type | Surface Roughness (micro-inches) | Contact angle at 10 sec (degrees) | Volume Absorption (%) at 30 sec |
| --- | --- | --- | --- |
| Unmodified | 70-110 | 105 | 70 |
| Sanded | 60-70 | 101 | 100 |
| Polish #4 | <15 | 82 | 15 |

Figure 9:
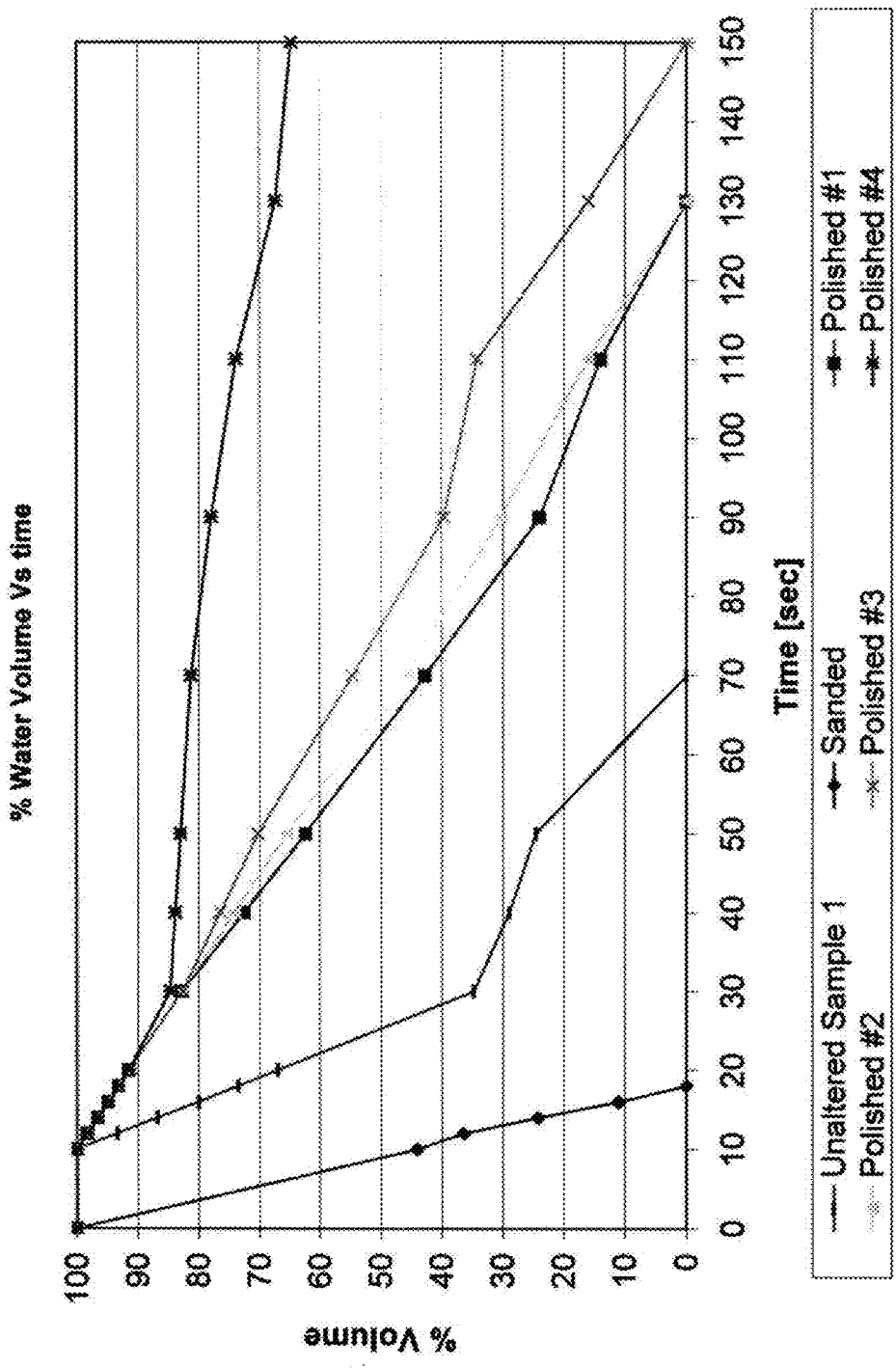
FIG. 9 is a graph showing percentage water volume vs. time.

Samples that were sanded had a somewhat smoother finish than the unmodified surfaces, but the contact angle did not show any significant change. The amount of water absorbed was even higher than the original sample. However, in this example, when the surface was polished to a surface finish of 15 micro-inches or less, the water contact angle was decreased and the amount of water absorbed into the electrode decreased significantly. The results of the water absorption testing is demonstrated clearly in FIG. 9, which shows water volume reduction vs. time. As can be seen, the sanded sample absorbed the water faster than the unaltered sample. Further, as can be seen, the polished samples 1-3 absorbed less than the unaltered sample. Advantageously, the fourth polished sample, which was polished using multiple steps and higher grit, over time periods greater than 30 seconds absorbed less than samples 1-3.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. Also the above alternatives, modifications and variations may be practiced in any combination thereof. The claims are intended to cover the indicated elements and steps in any arrangement or sequence that is effective to meet the objectives intended for the invention, unless the context specifically indicates the contrary.

What is claimed is:

1. A graphite electrode comprising a body having an axial direction and a radial direction, the body having an outer radial surface and two ends;
   one or more slats disposed along the outer radial surface of the body; and
   a sheet of compressed particles exfoliated graphite adjacent the outer surface, a portion of the sheet of graphite disposed in the slats, the portion having a density of less than 0.5 g/cc.

2. The electrode of claim 1 wherein the slats extend from a first of the two ends to a second of the two ends.

3. The electrode of claim 2 wherein a shape of the slats comprises a dovetail.

4. The electrode of claim 1 wherein the electrode comprises a pin-socket electrode.

5. The electrode of claim 4 wherein the depth of the dovetail comprise no more than 0.25 (0.63 cm) inches.

6. The electrode of claim 1 wherein the electrode comprises a pinless electrode.

7. The electrode of claim 1 wherein the sheet having a thickness when adjacent the outer surface of less than ¼" of its original thickness.

8. The electrode of claim 1 wherein a shape of the slats comprises a generally elongated U-shape.

9. The electrode of claim 1 further comprising a second sheet of compressed particles exfoliated graphite adjacent the outer surface, a portion of the second sheet of graphite disposed in the slats, such portion having a density of less than 0.5 g/cc.

10. A graphite electrode column comprising at least one graphite electrode as defined in claim 1.

11. The electrode of claim 1 wherein the slats extend in an orientation selected from the group consisting of: axial, circumferential or spiral.

12. The electrode of claim 1 wherein the slats disposed in a manner selected from the group consisting of: spiral manner, length-wise manner, substantially vertical manner, horizontal manner, a non-curved manner and any combination thereof.

13. A graphite electrode comprising a body having an axial direction and a radial direction, the body having an outer radial surface and two ends;
    one or more slats circumferential disposed along the outer radial surface of the body; and
    a sheet of compressed particles exfoliated graphite attached to the outer surface, a portion of the sheet of graphite disposed in the slats, the portion having a density of less than 0.5 g/cc.

14. The graphite electrode of claim 13 wherein the sheet adhered to the outer radial surface of the electrode.

15. The graphite electrode of claim 13 wherein the sheet mechanically attached to the outer radial surface of the electrode.

16. A graphite electrode comprising a body having an axial direction and a radial direction, the body having an outer radial surface and two ends; and a sheet of compressed particles exfoliated graphite attached to the outer surface, at least a portion of the sheet of graphite having a density of less than 0.5 g/cc.

* * * * *